United States Patent [19]

MOLT

[11] 3,931,263
[45] Jan. 6, 1976

[54] ORGANOTIN MERCAPTIDE PROCESS

[75] Inventor: Kenneth R. Molt, Montgomery, Ohio

[73] Assignee: Cincinnati Milacron Chemicals, Inc., Reading, Ohio

[22] Filed: June 13, 1974

[21] Appl. No.: 479,142

[52] U.S. Cl. .................................... 260/429.7
[51] Int. Cl.² ..................................... C07F 7/22
[58] Field of Search ........................ 260/429.7

[56] References Cited
UNITED STATES PATENTS

| | | | |
|---|---|---|---|
| 3,507,893 | 4/1970 | Reifenberg | 260/429.7 |
| 3,775,451 | 11/1973 | Brecker | 260/429.7 |

*Primary Examiner*—Helen M. S. Sneed
*Attorney, Agent, or Firm*—John W. Malley, et al.

[57] ABSTRACT

The following reactions are carried out in the presence of water, preferably using wet, newly prepared organotin sulfides:

(1) $(RSn)_2S + 2R_1X \rightarrow \underset{X}{\overset{SR_1}{RSn}} - S - \underset{X}{\overset{SR_1}{SnR}}$

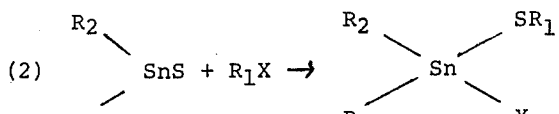

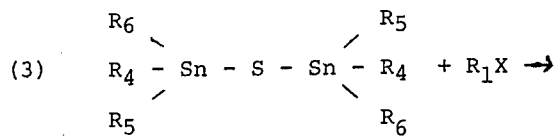

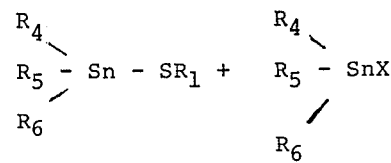

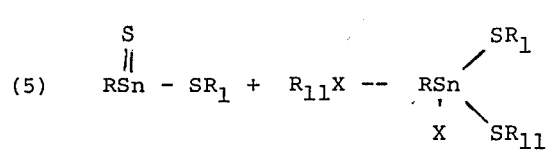

(5) $RSn \overset{S}{\underset{\|}{-}} SR_1 + R_{11}X \longrightarrow \underset{X}{\overset{SR_1}{RSn}} \diagdown SR_{11}$ wherein:

R, $R_1$, $R_3$, $R_4$, $R_5$, and $R_6$ are alkyl, cycloalkyl, alkenyl, aryl or aralkyl;

$R_1$ is $\pm(CH_2\pm)_n \overset{O}{\underset{\|}{C}} - OR_7$, $\pm(CH_2\pm)_m - O\overset{O}{\underset{\|}{C}} - R_{12}$, allyl, methallyl or benzyl;

$R_7$ is alkyl, cycloalkyl, alkenyl or aralkyl;
$R_{11}$ is defined as $R_1$;
$R_{12}$ is alkyl or alkenyl;
X is chlorine or bromine;
m is 2 or 3; and
n is 1 or 2.

25 Claims, No Drawings

ORGANOTIN MERCAPTIDE PROCESS

The following reactions are carried out in the presence of water, preferably using wet, newly prepared organotin sulfides:

(1) $(RSn)_2S + 2R_1X \rightarrow \underset{X}{\overset{SR_1}{RSn}} - S - \underset{X}{\overset{SR_1}{SnR}}$ (2) $\underset{R_3}{\overset{R_2}{\diagdown}} SnS + R_1X \rightarrow \underset{R_3}{\overset{R_2}{\diagdown}} Sn \underset{X}{\overset{SR_1}{\diagup}}$ (3) $\underset{R_5}{\overset{R_6}{\diagdown}} Sn - S - Sn \underset{R_6}{\overset{R_5}{\diagup}} + R_1X \rightarrow$ $\underset{R_6}{\overset{R_4}{\diagdown}} Sn - SR_1 + \underset{R_6}{\overset{R_4}{\diagdown}} SnX$ (4) $(RSn)_2S + 3R_1X \rightarrow \underset{Cl}{RSn(SR_1)_2} + \underset{Cl}{RSn - SR_1}$ (5) $\overset{S}{\underset{||}{RSn}} - SR_1 + R_{11}X \rightarrow \underset{X}{RSn} \underset{SR_{11}}{\overset{SR_1}{\diagup}}$ wherein:
R, $R_2$, $R_3$, $R_4$, $R_5$, and $R_6$ are alkyl, cycloalkyl, alkenyl, aryl or aralkyl;

$+CH_2+_n \overset{O}{\underset{||}{C}} - OR_7$,  $+CH_2+_m \overset{O}{\underset{||}{-OC}} - R_{12}$, allyl, methallyl or benzyl;
$R_7$ is alkyl, cycloalkyl, alkenyl or aralkyl;
$R_{11}$ is defined as $R_1$;
$R_{12}$ is alkyl or alkenyl;
X is chlorine or bromine;
m is 2 or 3; and
n is 1 or 2.

This application is a continuation-in-part of application Serial Number 449,435, filed March 8, 1974, the entire disclosure of which is hereby incorporated by reference.

The present invention is directed to a new method of preparing organotin mercaptides. It is based on the reaction of organotin sulfides with active organic halides in the presence of water. Preferably, wet, newly prepared organotin sulfides are used. The reactions involved are as follows:

(1) $(RSn)_2S + 2R_1X \rightarrow \underset{X}{\overset{SR_1}{RSn}} - S - \underset{X}{\overset{SR_1}{Sn}} - R$ (2) $\underset{R_3}{\overset{R_2}{\diagdown}} SnS + R_1X \rightarrow \underset{R_3}{\overset{R_2}{\diagdown}} Sn \underset{X}{\overset{SR_1}{\diagup}}$ (3) $\underset{R_6}{\overset{R_4}{\diagdown}} \overset{R_5}{\diagdown} Sn - S - Sn \underset{R_6}{\overset{R_5}{\diagup}} \overset{R_4}{\diagup} + R_1X \rightarrow$ $\underset{R_6}{\overset{R_4}{\diagdown}} Sn - SR_1 + \underset{R_6}{\overset{R_4}{\diagdown}} SnX$ (4) $(RSn)_2S + 3R_1X \rightarrow \underset{Cl}{RSn(SR_1)_2} + \underset{Cl}{RSn - SR_1}$ (5) $\overset{S}{\underset{||}{RSn}} - SR_1 + R_{11}X \rightarrow \underset{X}{RSn} \underset{SR_{11}}{\overset{SR_1}{\diagup}}$ wherein:
R, $R_2$, $R_3$, $R_4$, $R_5$, and $R_6$ are alkyl, usually of 1 to 20 carbon atoms, cycloalkyl, usually of 5 to 6 carbon atoms in the ring, alkenyl, usually of 2 to 20 or more frequently 3 to 18 carbon atoms, aryl, usually phenyl or alkyl phenyl having 1 to 4 carbon atoms in the alkyl group, or aralkyl, usually of 7 carbon atoms (R, $R_2$, $R_3$, $R_4$, $R_5$, and $R_6$ preferably are methyl);

$R_1$ is $+CH_2+_n \overset{O}{\underset{||}{C}} - OR_7$,  $+CH_2+_m \overset{O}{\underset{||}{-OC}} - R_{12}$, benzyl,  $CH_2 = \overset{R_{14}}{\underset{|}{C}} - CH_2 -$ where $R_{14}$ is hydrogen or methyl;
$R_{11}$ is defined as $R_1$;
$R_7$ is alkyl usually of 1 to 20 carbon atoms, cycloalkyl usually having 5 to 6 carbon atoms in the ring, alkenyl, usually of 2 to 20 carbon atoms, more commonly 3 to 18 carbon atoms, or aralkyl, usually of 7 carbon atoms;

$R_{12}$ is alkyl, usually of 1 to 19 carbon atoms, or alkenyl usually of 2 to 17 carbon atoms;

X is a halogen of atomic weight 35 to 80, i.e., chlorine or bromine;

n is an integer of 1 or 2; and m is an integer of 2 to 3.

In the parent case, aprotic solvents are employed as catalysts said solvents being:

(a) 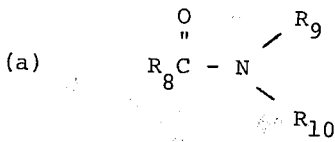

(b) 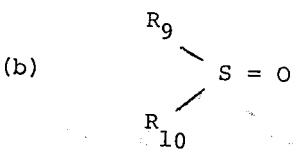

(c) 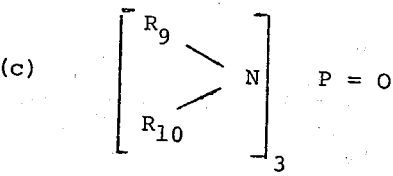, or (d) N—methyl—2—pyrrolidone, where $R_8$ is hydrogen or methyl and $R_9$ and $R_{10}$ are methyl or ethyl. The preferred catalyst in the parent case is dimethyl formamide. The amount of catalyst in the parent case is mentioned as varying, for example, from 0.1 to 10 moles per mole of organotin sulfide, preferably 0.8 to 8 moles per mole of the organotin sulfide.

Also, in the parent case, it is stated that it is critical to use the catalyst since in the absence of the catalyst degradation reactions predominate and little or no product is formed.

As catalysts there are mentioned in the parent case, dimethyl formamide, dimethyl acetamide, diethyl formamide, diethyl acetamide, dimethyl sulfoxide, diethyl sulfoxide, tris(dimethylamino)phosphine oxide, tris(diethylamino)phosphine oxide and N-methyl-2-pyrrolidone.

It has now been found that water wet, preferably freshly prepared, wet, organotinsulfides are much more reactive than dried organotinsulfides and will react with issoctylchloroacetate or other active organic halides in the absence of catalysts such as dimethylformamide or the others set forth above. Most preferably a slurry of organotin sulfide in water is employed.

Organotin sulfides are usually prepared by reacting aqueous $Na_2S$ with organotin chlorides. The insoluble organotin sulfides precipitate and are removed by filtration. Moisture is removed from the wet sulfides by heating at elevated temperatures. During the drying operation, it is possible that the polymeric sulfides are further polymerized and thus become less reactive.

For these dried and less reactive sulfides, a catalyst (e.g., dimethylformamide) is required to effect reaction with active organic halides as pointed out in the parent case.

Unexpectedly, by contrast, wet newly prepared organotin sulfides react readily in the absence of a catalyst.

As compounds of the formula $R_1X$ or $R_{11}X$ there can be used in the present invention: methyl chloroacetate, methyl bromoacetate, ethyl chloroacetate, propyl chloroacetate, propyl bromoacetate, butyl chloroacetate, butyl bromoacetate, hexyl chloroacetate, hexyl bromoacetate, octyl chloroacetate, octyl bromoacetate, isooctyl chloroacetate, isooctyl bromoacetate, 2-ethylhexyl chloroacetate, 2-ethylhexyl bromoacetate, isodecyl chloroacetate, isodecyl bromoacetate, decyl chloroacetate, decyl bromoacetate, dodecyl chloroacetate, dodecyl bromoacetate, hexadecyl chloroacetate, hexadecyl bromoacetate, octadecyl chloroacetate, octadecyl bromoacetate, eicosanyl chloroacetate, eicosanyl bromoacetate, cyclopentyl chloroacetate, cyclopentyl bromoacetate, cyclohexyl chloroacetate, cyclohexyl bromoacetate, benzyl chloroacetate, benzyl bromoacetate, vinyl chloroacetate, binyl bromoacetate, allyl chloroacetate, allyl bromoacetate, methallyl chloroacetate, methallyl bromoacetate, crotyl chloroacetate, crotyl bromoacetate, 3-bromopropyl octoate, 2-bromoethyl pelargonate, 3-bromopropyl acetate, 3-bromopropyl stearate, 2-chloroethyl linoleate, 2-chloroethyl linolenoleate, oleyl chloroacetate, oleyl bromoacetate, 2-chloroethyl acetate, 2-bromoethyl acetate, 2-chloroethyl propionate, 2-bromoethyl propionate, 2-chloroethyl butyrate, 2-bromoethyl butyrate, 2-chloroethyl valerate, 2-bromoethyl valerate, 2-chloroethyl pivalate, 2-bromoethyl pivalate, 2-chloroethyl caproate, 2-bromoethyl caproate, 2-chloroethyl octoate, 2-bromoethyl octoate, 2-chloroethyl decanoate, 2-bromoethyl decanoate, 2-chloroethyl laurate, 2-bromoethyl laurate, 2-chloroethyl palmitate, 2-bromoethyl palmitate, 2-chloroethyl stearate, 2-bromoethyl stearate, 2-chloroethyl eicosanate, 2-bromoethyl eicosanate, 2-chloroethyl acrylate, 2-bromoethyl acrylate, 2-chloroethyl methacrylate, 2-bromoethyl methacrylate, 2-chloroethyl crotonate, 2-bromoethyl crotonate, 2-chloroethyl oleate, 2-bromoethyl oleate, allyl chloride, allyl bromide, methallyl chloride, methallyl bromide, benzyl chloride, benzyl bromide, methyl 2-chloropropionate, methyl 2-bromopropionate, methyl 3-chloropropionate, methyl 3-bromopropionate, ethyl 2-chloropropionate, ethyl 2-bromopropionate, ethyl 3-chloropropionate, ethyl 3-bromopropionate, propyl 2-chloropropionate, propyl 3-bromopropionate, butyl 2-bromopropionate, butyl 3-chloropropionate, octyl 2-chloropropionate, octyl 3-chloropropionate, octyl 2-bromopropionate, octyl 3-bromopropionate, isooctyl 2-chloropropionate, isooctyl 2-bromopropionate, isooctyl 3-bromopropionate, isodecyl 2-chloropropionate, isodecyl 2-bromopropionate, isodecyl 3-chloropropionate, n-decyl 3-bromopropionate, dodecyl 2-chloropropionate, tetradecyl 3-chloropropionate, hexadecyl 2-chloropropionate, hexadecyl 3-chloropropionate, octadecyl 2-chloropropionate, octadecyl 3-chloropropionate, octadecyl 2-bromopropionate, octadecyl 3-bromopropionate, 2-ethylhexyl 3-chloropropionate, 2-ethylhexyl 2-chloropropionate, eicosanyl 3-chloropropionate, cyclohexyl 2-chloropropionate, cyclohexyl 3-bromopropionate, cyclohexyl 3-chloropropionate, benzyl 2-chloropropionate, benzyl 3-chloropropionate, benzyl 2-bromopropionate, vinyl 2-chloropropionate, vinyl 3-bromopropionate, allyl 2-chloropropionate, allyl 3-chloropropionate, allyl 2-bromopropionate, allyl 3-chloropropionate, allyl 2-bromopropionate, allyl 3-bromopropionate, methallyl 3-chloropropionate, crotyl 2-chloropropionate, oleyl 2-chloropropionate, oleyl 3-chloropropionate, oleyl 2-bromopropionate, oleyl 3-bromopropionate.

Examples of starting materials of the formula:

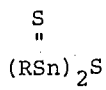

$(RSn)_2S$ are monomethyltin sulfide, monoethyltin sulfide, monobutyltin sulfide, monooctyltin sulfide, monododecyltin sulfide, monooctadecyltin sulfide, monoeicosanyltin sulfide, monocyclohexyltin sulfide, monocyclopentyltin sulfide, monovinyltin sulfide, mono-2-ethylhexyltin sulfide, monoallyltin sulfide, monomethallyltin sulfide, monooleyltin sulfide, monophenyltin sulfide, mono-p-tolyltin sulfide, mono-p-butylphenyltin sulfide, monobenzyltin sulfide.

Examples of starting materials within the formula:

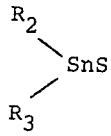

are dimethyltin sulfide, diethyltin sulfide, methyl butyltin sulfide, dipropyltin sulfide, dibutyltin sulfide, dihexyltin sulfide, dioctyltin sulfide, di-2-ethylhexyltin sulfide, diisooctyltin sulfide, bis(dodecyltin) sulfide, bis(octadecyltin) sulfide, bis(eicosanyltin) sulfide, bis(cyclohexyltin)sulfide, divinyltin sulfide, diallyltin sulfide, dimethallyltin sulfide, dicrotyltin sulfide, dioleyltin sulfide, diphenyltin sulfide, monomethyl-mono-phenyltin sulfide, di-p-tolyltin sulfide, di-p-butylphenyltin sulfide, dibenzyltin sulfide.

Examples of starting materials within the formula:

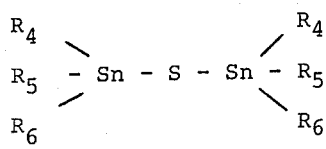

are: bis(trimethyltin)sulfide, bis(trimethyltin)sulfide, bis(tributyltin)sulfide, bis(trioctyltin)sulfide, bis(trioctadecyltin)sulfide, bis(trivinyltin)sulfide, bis(triallyltin)sulfide, bis(trimethallyltin)sulfide, bis(trioleyltin)sulfide, bis(triphenyltin)sulfide, bis(tri-p-tolyltin)sulfide, bis(tribenzyltin)sulfide.

Many of the products prepared in the present invention are old. Thus, Leistner Patent 2,641,596 discloses some of the non-chlorine containing compounds prepared by reaction (3). Brecker Patent 3,565,931 shows many compounds which can be prepared from the compounds made by reaction (1).

Hoye Patent 3,542,825 discloses many compounds prepared by reaction (2) and (4) as does the similar British Patent 1,117,652. Wowk Patent 3,665,025 and British Patent 1,297,550 disclose some of the compounds prepared by reaction (4) as well as compounds somewhat similar to those prepared in reaction (1).

The organotin mercaptides prepared by reactions (1), (2), (3) and (4) are useful for the same purposes as Leistner, Brecker Patent 3,565,931, Brecker Patent 3,630,992, Hoye, Wowk or British Patents 1,117,652 and 1,297,550. They are particularly useful not only as stabilizers but as intermediates for making stabilizers for polyvinyl chloride resins by replacing the halogen atom or atoms with oxygen, carboxyl, mercaptyl, or ester mercaptyl; they are also less expensive than organotin mercaptides prepared from mercaptans and organotin oxides or halides.

The organotin mercaptide stabilizers prepared in reactions (1), (2) and (3) of the present invention can be used with halogen containing vinyl and vinylidene resins in which the halogen is attached directly to the carbon atoms. Preferably, the resin is a vinyl halide resin, more preferably, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the halogen resin there can be employed chlorinated polyethylene having 14 to 75%, e.g., 27% chlorine by weight, polyvinyl chloride, polyvinylidene chloride, polyvinyl bromide, polyvinyl fluoride, polyvinylidene fluoride, copolymers of vinyl chloride with 1 to 90%, preferably, 1 to 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96.4 sold commercially as VYNW), a vinyl chloride-vinylacetate (87:13), vinyl chloride-vinyl acetate-maleic anhydride (86:13:1), vinyl chloridevinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls of 100–106°C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

The tin containing stabilizers are normally used in an amount of 0.01 to 10% by weight of the resin, more preferably 0.1 to 5% of the tin compound is used by weight of the resin. The organotin mercaptide products of reactions (1), (2) and (3) are clear, mobile liquids that are soluble in hydrocarbon and polar solvents such as benzene, toluene, acetone, and ethyl acetate. The mono- and di-organotin sulfides used as starting materials in reactions (1) and (2) are polymeric, high-melting solids and are insoluble in the reaction products and in most solvents that dissolve the reaction products. It is evident, therefore, the the reaction products are not mere solutions of the organotin sulfides.

Specific combinations of organotin sulfides and $R_1X$ compounds in addition to those set forth in the working examples and mentioned as illustrative only and not as limiting are given below. The numbers indicate the number of moles of catalyst (and in reaction 1, also the moles of other reactant) per mole of starting sulfide.

Reaction (1)

1. Monomethyltin sulfide + 2 methyl chloroacetate
2. Monooctyltin sulfide + 2 methyl bromoacetate
3. Monooctadecyltin sulfide + 2 isodecyl chloroacetate
4. Monobenzyltin sulfide + 2 butyl chloroacetate
5. Monophenyltin sulfide + 2 cyclohexyl chloroacetate
6. Monoallyltin sulfide + 2 benzyl chloroacetate
7. Monomethyltin sulfide + 2 2-chloroethyl stearate
8. Monobutyltin sulfide + 2 2-chloroethyl oleate
9. Monocyclohexyltin sulfide + 2 2-chloroethyl acetate
10. Monomethyltin sulfide + 2 2-chloroethyl methacrylate
11. Monomethyltin sulfide + 2 dodecyl 3-chloropropionate
12. Monobutyltin sulfide + 2 allyl chloride Reaction (2)

13. Dimethyltin sulfide + ethyl chloroacetate
14. Dibenzyltin sulfide + propyl bromoacetate
15. Dioctyltin sulfide + decyl chloroacetate
16. Dibutyltin sulfide + sec. butyl chloroacetate
17. Di-p-tolyltin sulfide + cyclohexyl bromoacetate
18. Dioleyltin sulfide + phenethyl chloroacetate
19. Dimethyltin sulfide + 2-chloroethyl palmitate
20. Dibutyltin sulfide + 2-bromoethyl crotonate
21. Dicyclohexyltin sulfied + 2-chloroethyl pivalate
22. Dimethyltin sulfide + 2-chloroethyl acrylate
23. Dimethyltin sulfide + isooctyl 3-bromopropionate
24. Dibutyltin sulfide + methallyl bromide Reaction (3)

25. Bis(trimethyltin)sulfide + isopropyl chloroacetate
26. Bis(tribenzyltin)sulfide + 2-ethylhexyl chloroacetate
27. Bis(trioctyltin)sulfide + nonyl bromoacetate
28. Bis(tributyltin)sulfide + hexyl ahloroacetate
29. Bis(triphenyltin)sulfide + isooctyl chloroacetate
30. Bis(triallyltin)sulfide + benzyl chloroacetate
31. Bis(trimethyltin)sulfide + 2-chloroethyl eicosanate
32. Bis(tributyltin)sulfide + bromoethyl methacrylate
33. Bis(tricyclohexyltin)sulfide + 2-chloroethyl myristate
34. Bis(trimethyltin)sulfide + 2-bromoethyl oleate
35. Bis(trimethyltin)sulfide + dodecyl 3-chloropropionate
36. Bis(tributyltin)sulfide + allyl chloride Reaction (4)

37. Monomethyltin sulfide + 3 methyl chloroacetate
38. Monooctyltin sulfide + 3 methyl bromoacetate
39. Monooctadecyltin sulfide + 3 isodecyl chloroacetate
40. Monobenzyltin sulfide + 3 butyl chloroacetate
41. Monophenyltin sulfide + 3 cyclohexyl chloroacetate
42. Monoallyltin sulfide + 3 benzyl chloroacetate
43. Monomethyltin
43. Monomethyltin stearate
44. Monobutyltin sulfide + 3 2-chloroethyl oleate
45. Monocyclohexyltin sulfide + 3 2-chloroethyl butyrate
46. Monomethyltin sulfide + 3 2-chloroethyl methacrylate
47. Monomethyltin sulfide + 3 hexyl 3-chloropropionate
48. Monobutyltin sulfide + 3 allyl bromide The temperature is not critical, but heating is usually employed, preferably between 130–155°C. The temperature is usually at least 90°C. and can be as high as 200°C. for example.

Unless otherwise indicated, all parts and percentages are by weight.

The lack of reaction by a dried sulfide is shown in Example 1.

EXAMPLE 1

One-tenth mole of dried dimethyltin sulfide was mixed with one-tenth mole of isooctylchloroacetate and heated under nitrogen. At 90°C., solution of the solid dimethyltin sulfide was complete and a clear, nearly colorless liquid resulted. After a 2-hour reaction period at 135–145°C., the reaction mixture was cooled. At 90°C., precipitation of unreacted dimethyltin sulfide began. Precipitation was completed by cooling to 20°C. The unreacted dimethyltin sulfide was removed by filtration and freed of issoctylchloroacetate by washing with heptane. Ninety-seven percent of the starting dimethyltin sulfide was recovered unchanged.

The reactivity of wet, freshly prepared sulfides is shown by the following examples:

EXAMPLE 2

To 0.4 M of $Na_2S$ in 100 g water was added 0.4 M of aqueous (50% $H_2O$) $Me_2SnCl_2$ over a 30-minute period at 50–70°C. The resulting slurry of $Me_2SnS$ was heated to 90°C. and then mixed with 0.4 M of isooctylchloroacetate. After heating to 95–105°C. for 15 minutes, two clear layers formed. The lower organic layer was removed and reacted for 2 hours at 135–140°C. under nitrogen. After cooling to 25°C. the reaction mixture was filtered to remove a trace of salt carried over from the wet sulfide. The product is soluble in benzene in all proportions and is believed to have the following structure:

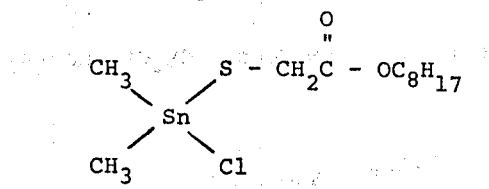

Yield = 151 grams (155 cal'c)
Cl — 9.0% (cal'c 9.16%)
S — 8.3% (cal'c 8.26%)

Two-tenths of a mole of the above product was reacted with 0.2 M of isooctylthioglycolate and 0.2 M of aqueous ammonia to form dimethyltin bis(isooctylthioglycolate) in good yield. This compound was tested as a stabilizer for PVC and compared with dimethyltin bis(isooctylthioglycolate) prepared in the conventional manner from dimethyltin dichloride and isooctylthioglycolate. Both performed equally well.

EXAMPLE 3

To 0.2 M (mole) of $Na_2S$ in 50 g of $H_2O$ was added 0.2 M of aqueous $Me_2SnCl_2$ in 30 minutes of 50–70°C. The resulting slurry of $Me_2SnS$ was heated to 90°C. and then mixed with 0.2 M of 2-chloroethyloctanoate. After mixing and heating for 15 minutes at 95–105°C. the $Me_2SnS$ dissolved in the organic phase and two clear layers developed upon settling. The lower organic phase was removed and reacted for 2 hours at 145–155°C. under nitrogen. Upon cooling to 25°C., no $Me_2SnS$ precipitated indicating completion of the reaction. This intermediate was reacted with 0.2 M of 2-mercaptoethyl octanoate and 0.2 M of aqueous ammonia to form dimethyltin bis(2-thioethyloctanoate).

Yield — 94.8% (based on $Me_2SnCl_2$)
Appearance — colorless oil
PVC Stabilizer Performance — equivalent ot the same compound prepared from $Me_2SnCl_2$ and 2-mercaptoethyl octanoate.

The reactions involved in this example are believed to be:

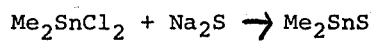

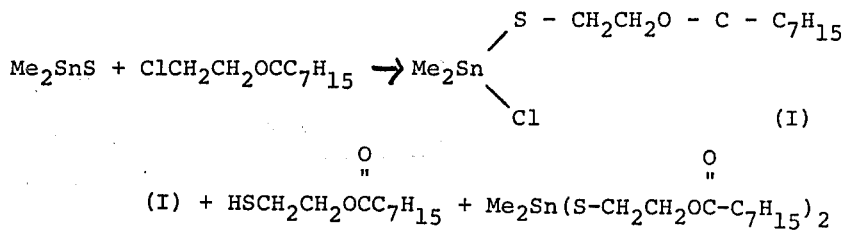

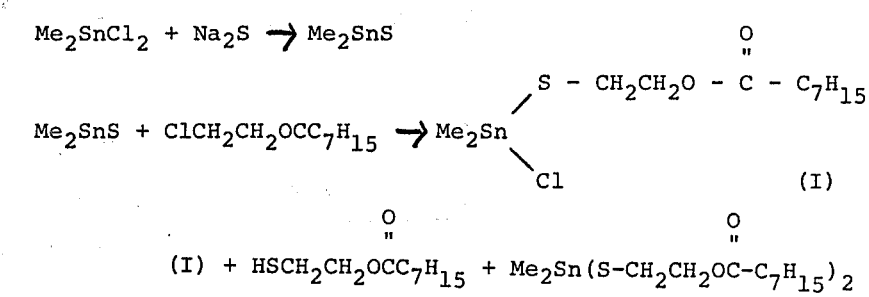

EXAMPLE 4

To a mixture of 50 g water, 0.2 M $MeSnCl_3$ and 0.2 M isooctylthioglycolate was added .2 M of dilute aqueous NaOH then .2 M of diluate aqueous $Na_2S$. The mixture was heated to 80°C. and then settled. The lower organic phase was removed and mixed with 0.2 M isooctylchloroacetate and heated under nitrogen to 145–155°C. for 2 hours. Upon cooling, this intermediate was converted to a finished stabilizer by treating with 0.1 mole of aqueous $Na_2S$. The reactions involved are believed to be:

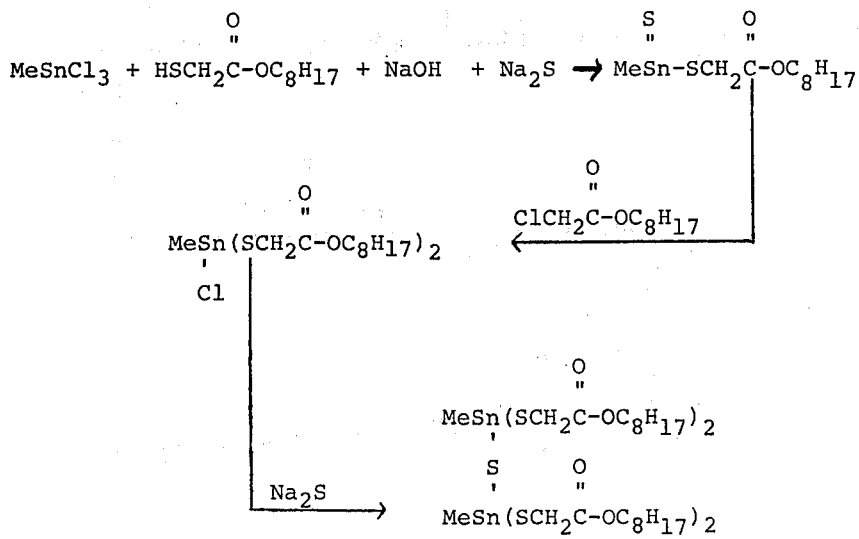

Yield—105 g (94.4%)
Appearance—colorless oil
PVC Stabilizer Performance—equivalent to the same compound prepared from MeSnCl₃, isooctylthioglycolate and Na₂S.

EXAMPLE 5

To a mixture of 50 g water, 0.2 M MeSnCl₃ and 0.2 M isooctylthioglycolate was added 0.2 M of dilute aqueous NaOH then 0.2 M of dilute aqueous Na₂S. The mixture was heated to 80°C. and then settled. The lower organic phase was removed and mixed with 0.2 M isooctylchloroacetate and heated under nitrogen to 145–155°C. for 2 hours. Upon cooling, this intermediate was mixed with 0.2 M isooctylthioglycolate and 0.2 M of aqueous ammonia to form methyltin tris-isooctylthioglycolate.

Yield—146 g (148.8 cal'c)
Appearance—colorless oil
PVC Stabilizer Performance—equivalent to the same compound made from MeSnCl₃, isooctylthioglycolate and aqueous ammonia.

EXAMPLE 6

The process of Example 4 was repeated except that 2-mercaptoethyl octanoate was used in place of isooctylthioglycolate and 2-chloroethyloctanoate was used in place of isooctylchloroacetate in the same molar amounts to form thio-bis[methyltin bis(2-thioethyloctanoate)] in good yield.

Appearance—plae yellow oil
PVC Stabilizer Performance—equivalent to the same compound prepared from MeSnCl₃, 2-mercaptoethyloctanoate and Na₂S.

REACTIONS

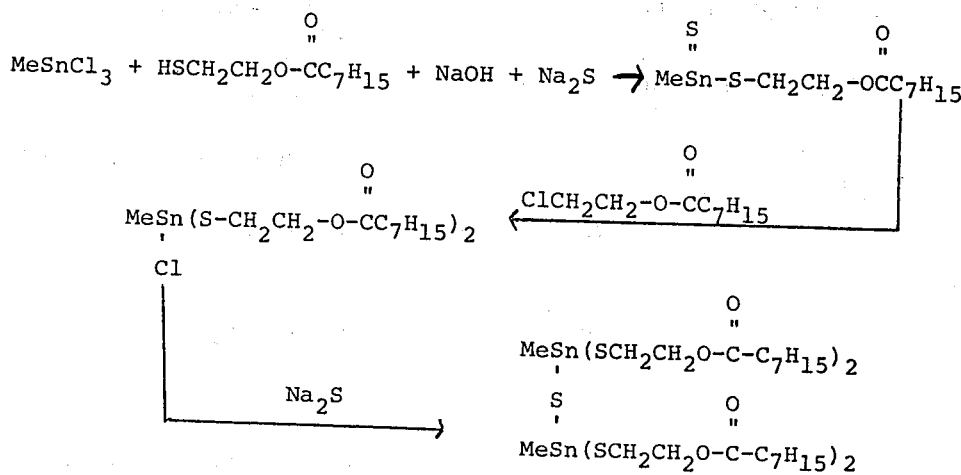

EXAMPLE 7

The process of Example 5 was repeated except that 2-mercaptoethyl octanoate was used in place of isooctylthioglycolate and 2-chloroethyloctanoate was used in place of isooctyl chloroacetate in the same molar amounts to form methyltin tris(2-thioethyloctanoate) in good yield.

Appearance—colorless oil

REACTIONS

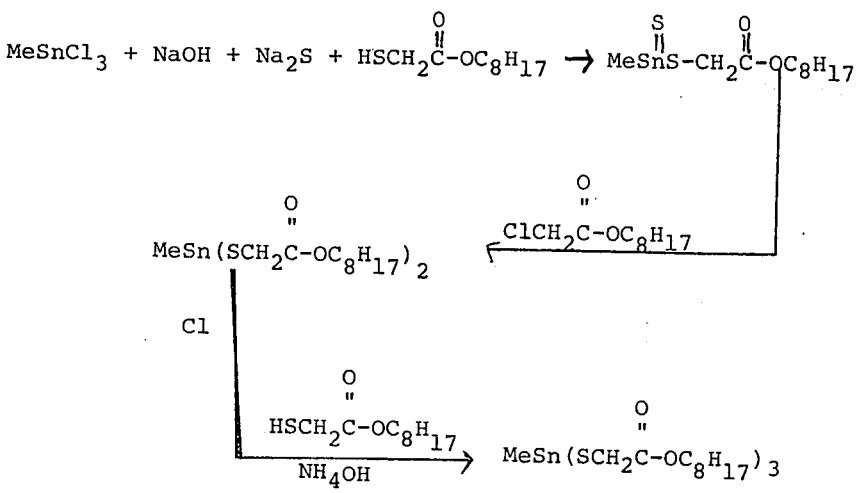

PVC Stabilizer Performance—equivalent to the same compound made from MeSnCl₃ and 2-mercaptoethyl octanoate.

Appearance—yellow oil
Performance—when tested in PVC this compound was found to be an effective stabilizer.

REACTIONS

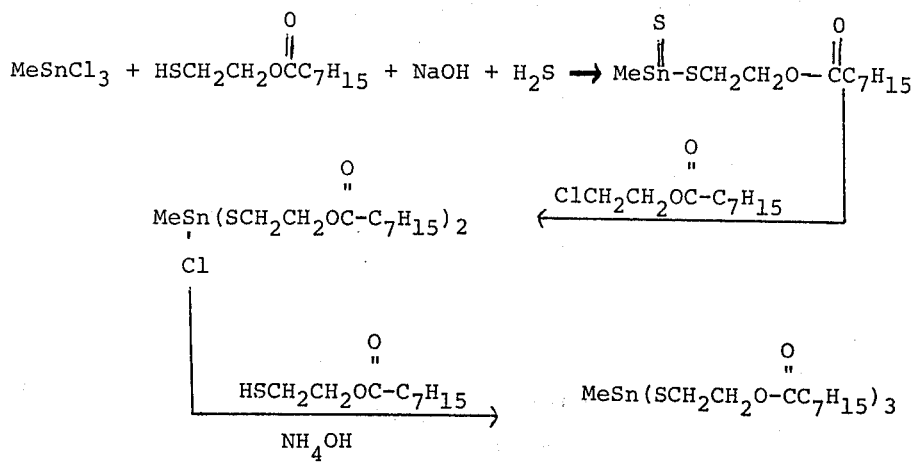

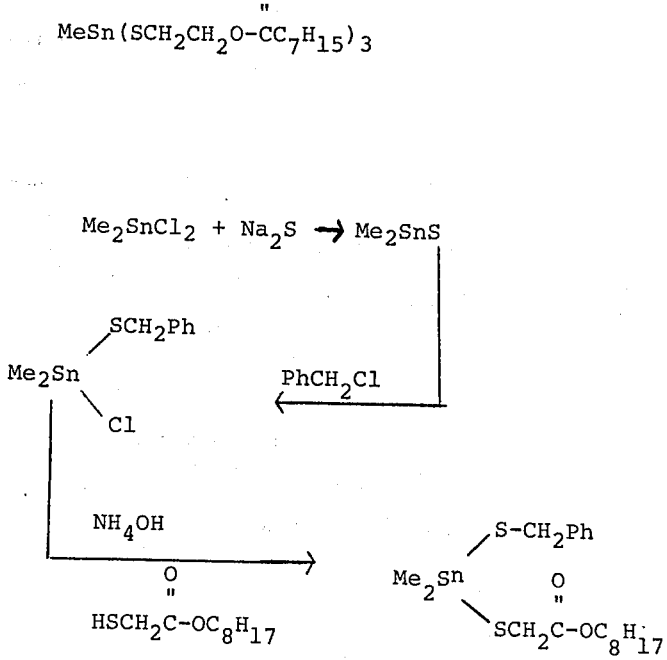

EXAMPLE 8

To 0.2 M of Na₂S in 50 g of H₂O was added 0.2 M of aqueous Me₂SnCl₂ in 30 minutes at 50–70°C. The resulting slurry of Me₂SnS was heated to 90°C. and then mixed with 0.2 M of benzyl chloride. After mixing and heating for 10 minutes at 95–100°C. the Me₂SnS dissolved in the organic phase and two clear layers developed upon settling. The lower organic phase was removed and reacted for 2 hours at 145–155°C. under nitrogen. Upon cooling to 30°C., this intermediate was reacted with 0.2 M isooctylthioglycolate and 0.2 M of aqueous ammonia to form dimethyltin isooctylthioglycolate-benzylmercaptide in good yield.

EXAMPLE 9

To a mixture of 50 g H₂O, 0.2 M MeSnCl₃ and 0.2 M isooctyl-thioglycolate was added 0.2 M of dilute aqueous NaOH then 0.2 M of dilute aqueous Na₂S. The mixture was heated to 80°C. and then settled. The lower product layer was removed and mixed with 0.2 M of benzyl bromide and heated under N₂ to 145–155°C. for 2 hours. Upon cooling, this intermediate was mixed with 0.2 M of isooctylthioglycolate and 0.2 M of aqueous ammonia to form methyltin bis(isooctylthioglycolate)benzylmercaptide in good yield.

Appearance—yellow oils

Performance—when tested in PVC this compound was found to be an effective stabilizer.

REACTIONS

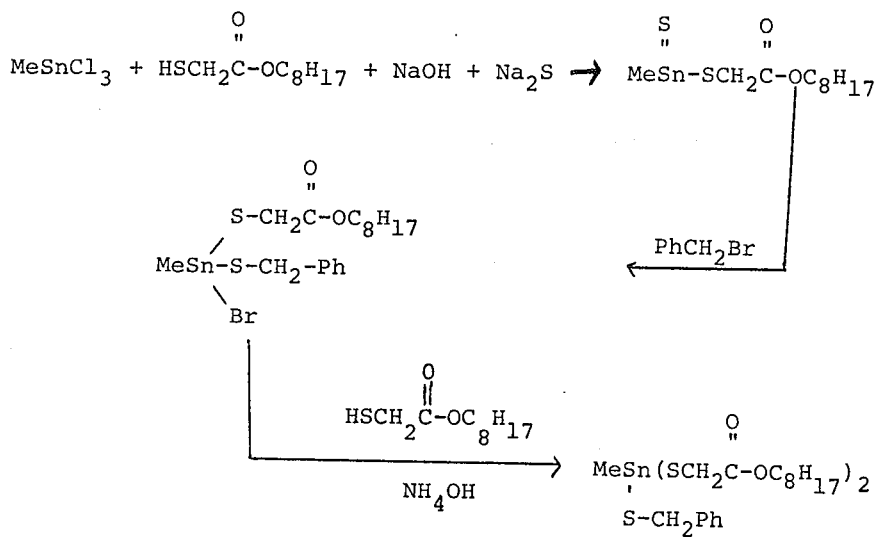

EXAMPLE 10

To 0.2 M of $Na_2S$ in 50 g of $H_2O$ was added 0.2 M of aqueous $Me_2SnCl_2$ over a 30 minute period at 50–70°C. The resulting slurry of $Me_2SnS$ was heated to 90°C. and then mixed with 0.2 M of isooctyl-3-chloropropionate. After mixing and heating for 15 minutes at 95–105°C., the $Me_2SnS$ dissolved in the organic phase and two clear layers developed upon settling. The lower organic phase was removed and reacted for 2 hours at 145–155°C. under nitrogen. Upon cooling, this intermediate was reacted with 0.2 M of isooctyl-3-mercaptopropionate and 0.2 M of aqueous NaOH to form dimethyltin bis-isooctyl-thiopropionate in good yield.

Appearance—colorless oil
Performance—when tested in PVC this compound was an effective stabilizer

REACTIONS

EXAMPLE 11

A slurry of 0.5 mole of monomethyltin sulfide in water made by reacting aqueous $Na_2S$ with methyltin tri-chloride is mixed with 1.0 mole of isooctyl chloroacetate and heated and further treated in the manner described in Example 2. The structure of the product is believed to be:

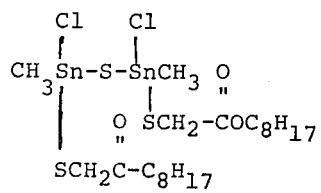

EXAMPLE 12

Example 2 is repeated replacing the isooctyl chloroacetate by the same molar amount of isooctyl-3-chloropropionate to form:

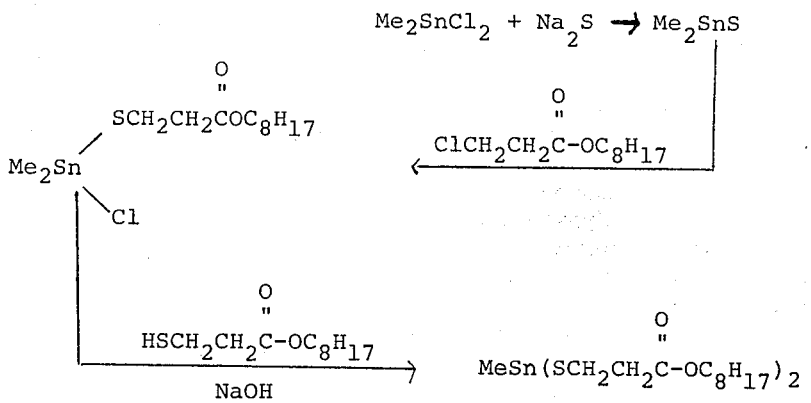

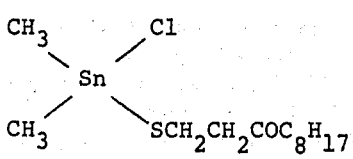

EXAMPLE 13

Example 2 is repeated replacing the dimethyltin dichloride by the same molar amount of dibutyltin dichloride to form:

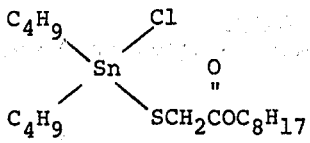

EXAMPLE 14

Example 11 is repeated replacing the methyltin trichloride by the same molar amount of butyltin trichloride to produce the corresponding butyl analogue of the product of Example 11.

EXAMPLE 15

Example 2 is repeated replacing the isooctyl chloroacetate by the same molar amount of isooctyl bromoacetate to produce:

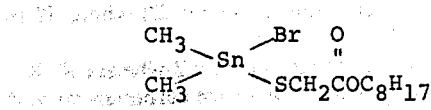

EXAMPLE 16

Example 8 is repeated replacing the benzyl chloride by the same molar amount of benzylbromide to form as the intermediate:

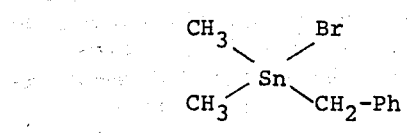

EXAMPLE 17

The procedure of Example 11 is repeated except that 1.5 moles of isooctyl chloroacetate is employed. The product is believed to be a mixture of equal molar amounts of:

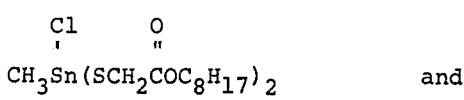

and

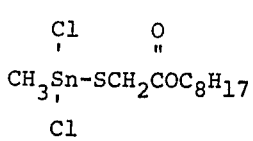

In making the starting compounds for reaction 5, there can be reacted a compound of the formula $RSnCl_3$ with a compound of the formula $HSR_1$ + alkali metal (e.g., sodium or potassium) or ammonium sulfide in water. The compound $HSR_1$ can be any of the $HSR_1$ analogues of the compounds $R_1X$ set forth above.

In the process of the invention as illustrated in Examples 4–7 and 9, the organic phase reacted with the isooctyl chloroacetate, 2-chloroethyl octoate or the benzyl bromide was not dried and hence contained water.

What is claimed is:

1. A process of preparing an organotin halide mercaptide or a mixture of an organotin halide and an organotin mercaptide from an organotin sulfide comprising reacting in the absence of a catalyst:

(1) 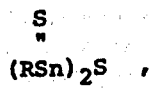

(2) 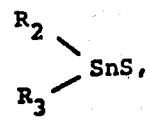

(3) 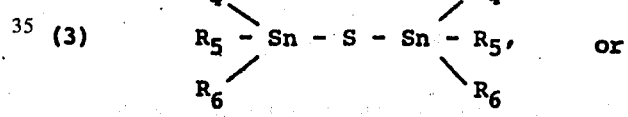 or (4) 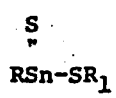

with a compound of the formula $R_{11}X$, while the organotin sulfide is in the water wet condition, where R, $R_2$, $R_3$, $R_4$, $R_5$ and $R_6$ are alkyl, cycloalkyl, alkenyl, aryl or aralkyl, $R_1$ and $R_{11}$ are

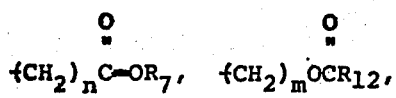

alkyl, cycloalkyl, alkenyl or aralkyl, $R_{12}$ is alkyl or alkenyl, X is halogen of atomic weight 35 to 80, n is 1 of 2, m is 2 or 3, and $R_{14}$ is hydrogen or methyl.

2. A process according to Claim 1 wherein the temperature is between 90 and 200°C.

3. A process according to claim 2 wherein the reaction is carried out with a slurry of the organotin sulfide in water.

4. A process according to claim 2 wherein the temperature is 130 to 155°C.

5. A process according to claim 3 wherein R, $R_2$, $R_3$, $R_4$, $R_5$, and $R_6$ are alkyl of 1 to 20 carbon atoms, cycloalkyl having 5 to 6 carbon atoms in the ring, alkenyl of 2 to 20 carbon atoms, phenyl, alkylphenyl having up to 4 carbon atoms in the alkyl group, $R_7$ is alkyl of 1 to 20 carbon atoms, cycloalkyl having 5 to 6 carbon atoms in the ring, alkenyl of 2 to 20 carbon atoms or benzyl, $R_{12}$ is alkyl of 1 to 19 carbon atoms or alkenyl of 2 to 17 carbon atoms.

6. A process according to claim 5 wherein X is chlorine.

7. A process according to claim 5 wherein R is alkyl of 1 to 8 carbon atoms.

8. A process according to claim 2 wherein the organotin sulfide has formula (1), (2), or (3).

9. A process according to claim 8 wherein the organotin sulfide has formula (2).

10. A process according to claim 9 comprising reacting 1 mole of

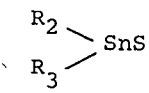

with 1 mole of $R_1X$ to form:

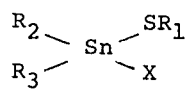

11. A process according to claim 10 wherein the reaction is carried out using an aqueous slurry of the organotin sulfide.

12. A process according to claim 10 wherein $R_2$ and $R_3$ are methyl.

13. A process according to claim 12 where in $R_{11}$ is $(CH_2)_nCOR_7$, $(CH_2)_mOCR_{12}$ or benzyl.

14. A process according to claim 13 wherein $R_7$ is alkyl of 6 to 18 carbon atoms and $R_{12}$ is alkyl of 5 to 17 carbon atoms.

15. A process according to claim 14 wherein $R_2$ and $R_3$ are both methyl and m is 2.

16. A process according to claim 8 wherein the organotin sulfide has formula (1).

17. A process according to claim 8 wherein the organotin sulfide has formula (3).

18. A process according to claim 2 wherein the organotin sulfide has formula (4).

19. A process according to claim 18 comprising reacting 1 mole of

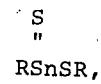

with 1 mole of $R_{11}X$.

20. A process according to claim 19 wherein $R_1$ is

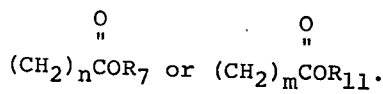

21. A process according to claim 20 wherein $R_7$ is alkyl of 6 to 18 carbon atoms, $R_{12}$ is alkyl of 5 to 17 carbon atoms and $R_{11}$ is

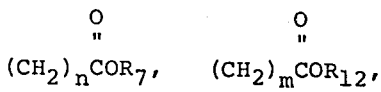

or benzyl.

22. A process according to claim 21 where R is methyl and m is 2.

23. A process according to claim 2 wherein R, $R_2$, $R_3$, $R_4$, $R_5$ and $R_6$ are alkyl of 1 to 8 carbon atoms and $R_1$ and $R_{11}$ are

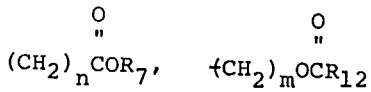

or benzyl, $R_7$ is alkyl of 1 to 18 carbon atoms, alkenyl of 3 to 18 carbon atoms, or benzyl, $R_{12}$ is alkyl of 1 to 17 carbon atoms or alkenyl of 17 carbon atoms.

24. A process according to claim 2 wherein the reaction is carried out employing a mixture consisting essentially of (1) said organotin sulfide, (2) the compound $R_{11}X$ and (3) water.

25. A process according to claim 24 wherein the mixture consists of (1) said organotin sulfide, (2) the compound $R_{11}X$ and (3) water.

* * * * *

UNITED STATES PATENT OFFICE
CERTIFICATE OF CORRECTION

Patent No. 3,931,263      Dated January 6, 1976

Inventor(s) KENNETH R. MOLT

It is certified that error appears in the above-identified patent and that said Letters Patent are hereby corrected as shown below:

Claim 10

Line 32, change "$R_1X$" to read --$R_{11}X$--.

Line 35, in the formula, change "$SR_1$" to read --$SR_{11}$--.

Claim 19

In the formula, change "RSnSR" to read --$RSnSR_1$--.

Claim 20

In the formula, change "$COR_{11}$" to read --$OCR_{12}$--.

Claim 21

In the formula, change "$COR_{12}$" to read --$OCR_{12}$--.

Claim 23

Line 48, change "or alkenyl of 17" to read --or alkenyl of 2-17--.

Signed and Sealed this twenty-ninth Day of June 1976

[SEAL]

Attest:

RUTH C. MASON      C. MARSHALL DANN
*Attesting Officer*      *Commissioner of Patents and Trademarks*